United States Patent [19]

Serba

[11] Patent Number: 4,736,541

[45] Date of Patent: Apr. 12, 1988

[54] TROLLEY ASSEMBLY FOR FISHING NETS

[76] Inventor: Henry S. Serba, 4343 N. Clarendon, Apt. 1512, Chicago, Ill. 60613

[21] Appl. No.: 23,543

[22] Filed: Mar. 9, 1987

[51] Int. Cl.[4] .................................................. A01K 73/12
[52] U.S. Cl. ............................................ 43/8; 43/27.2; 254/411
[58] Field of Search ................... 43/8, 27.2; 212/76, 212/78, 79, 82; 254/388, 402, 403, 411

[56] References Cited

U.S. PATENT DOCUMENTS

| | | | |
|---|---|---|---|
| 392,690 | 11/1888 | Ricker | 212/82 |
| 617,155 | 1/1899 | Gilon | 254/388 |
| 1,992,619 | 2/1935 | Johnson | 43/27 |
| 2,206,569 | 7/1940 | John | 43/27.2 |
| 2,639,535 | 5/1953 | Greske | 43/27.2 |
| 2,753,647 | 7/1956 | Erickson | 43/27.2 |
| 2,993,292 | 7/1961 | Schafer | 43/8 |

Primary Examiner—Nicholas P. Godici
Assistant Examiner—Carmine Cuda
Attorney, Agent, or Firm—Wood, Dalton, Phillips, Mason & Rowe

[57] ABSTRACT

A trolley assembly for use upon a line which is anchored in the water for retrieving a fishing net. The trolley assembly includes a weighted body member having a pair of trolley arms extending therefrom. The trolley arms are disposed at an angle to one another and are integrally associated with the body member to define a generally V-shaped assembly. The body member includes a loop disposed on a line bisecting the angle between the trolley arms for affixing a net securing line opposite the trolley arms. The trolley assembly also includes a pair of trolley wheels adapted to ride on the anchored line. One of the trolley wheels is mounted for wheel-rolling movement on each of the trolley arms. The trolley wheels are disposed in spaced relation to the body member. With these features of construction, one end of the fishing net can be secured to the trolley assembly with the net securing line and the other end of the fishing net can be controlled by a fishing line secured thereto.

16 Claims, 1 Drawing Sheet

U.S. Patent  Apr. 12, 1988  4,736,541
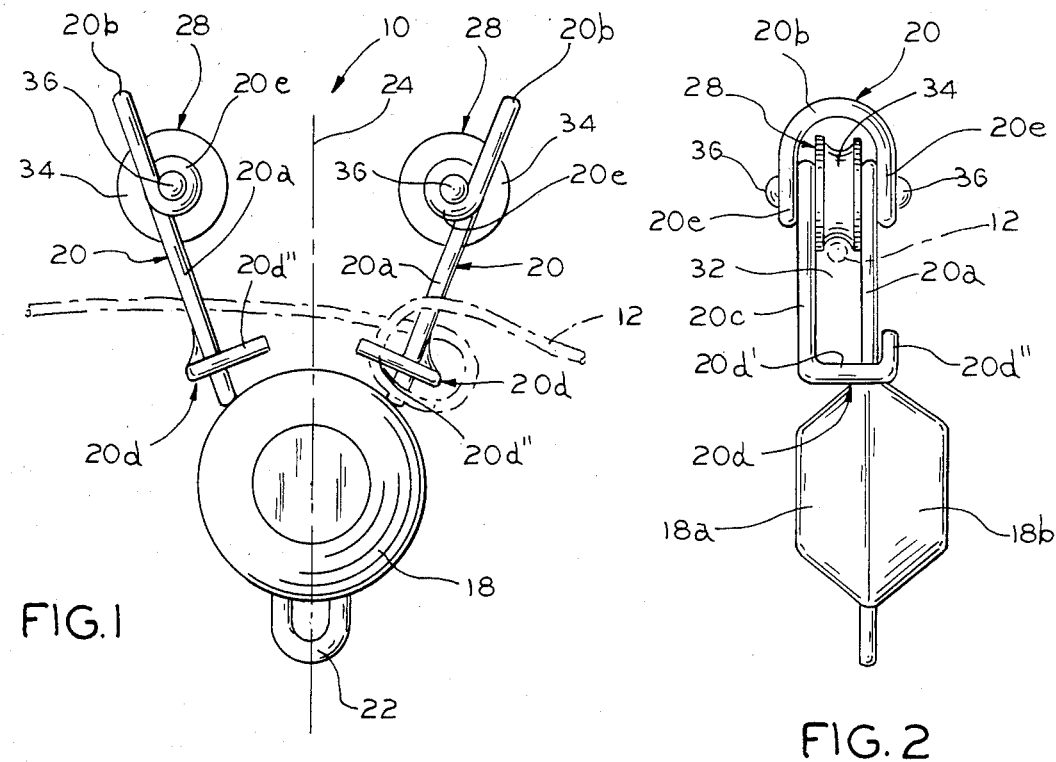
FIG.1
FIG.2
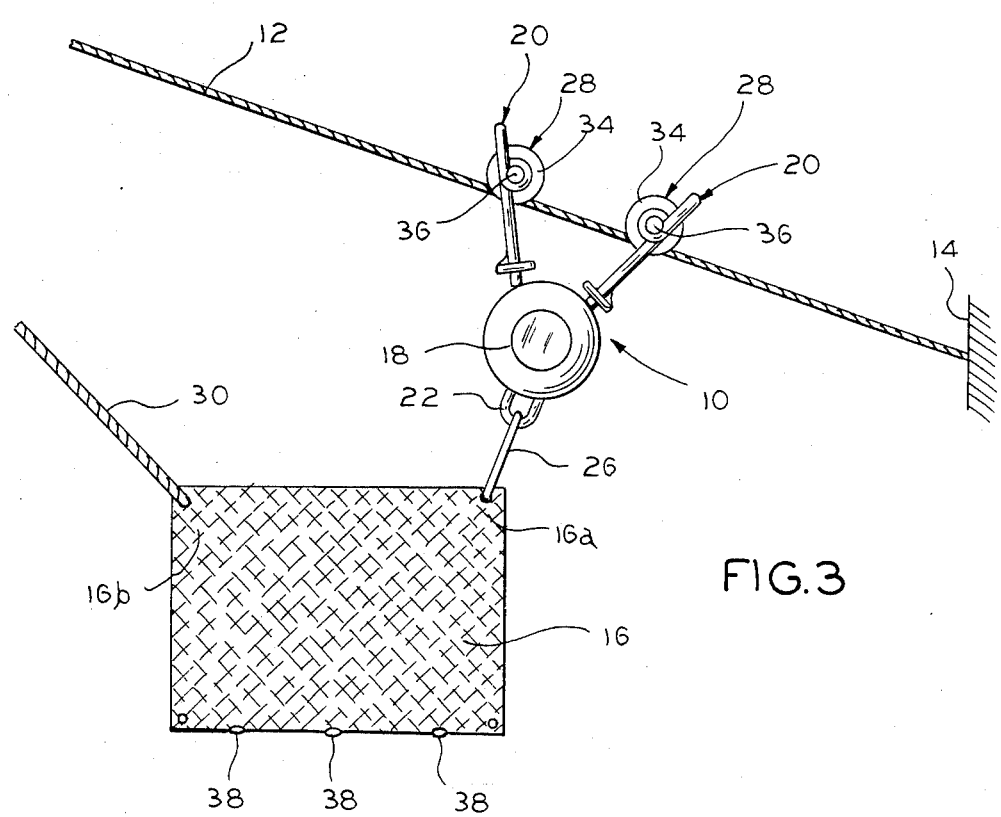
FIG.3

TROLLEY ASSEMBLY FOR FISHING NETS

FIELD OF THE INVENTION

The present invention generally relates to trolley assemblies and, more particularly, to trolley assemblies for fishing nets and the like.

BACKGROUND OF THE INVENTION

In the past, many different types of trolley assemblies for fishing nets have been proposed. These usually include an elongated sinker or weight together with pulley frames which are fastened at longitudinally spaced points to the sinker or weight with the pulleys being disposed in the frames for rolling movement along a relatively stationary or anchored line. However, with such trolley assemblies, there have been a number of problems in attaching and maintaining a trolley on a line that has been anchored.

In particular, prior art constructions have been severely deficient in securely maintaining an anchored line in rolling engagement with the trolley wheels. This has principally been due to the fact that pulley frames or arms have failed to provide a confined opening into which the anchored line can be introduced while also providing a pulley mounted in such a manner that the anchored line will always ride within the grooved rim of a pulley rather than become stuck between the outside surface of the pulley and the pulley frame no matter what the orientation of the trolley assembly. Further, trolley assemblies have been constructed in a manner that renders it difficult to introduce the line into position for rolling engagement.

More specifically, the pulley brackets were usually so designed that movement through the water would oftentimes cause the assembly to become disengaged from the anchored line. Even when this did not occur, each pulley bracket or frame usually had a flexible clamp portion or movable yoke portion through which the anchored line passed. With a construction of this type, the arm which closed the open side of the yoke would become loose after a short period of use rendering it prone to opening under wave action.

When using a gill net for catching fish such as smelt, it is recognized as important for the net to be maintained in a vertical position in the desired depth of water to obtain optimum results. This is usually done by utilizing anchor means connected to one end of an anchored line after introduction of which a fishing line having a gill net attached thereto is supported for movement upon the anchored line by means of a trolley assembly of the type described herein. In this manner, the gill net can be placed at a desired water depth for later removal therefrom, but the difficulty in moving the trolley assembly on the anchored line without fouling has often produced less than satisfactory results.

As will be appreciated by those skilled in gill net fishing, this problem is aggravated by reason of the design of the conventional trolley assembly. The length of trolley weights carried below distantly spaced trolley arms or pulley brackets combined with the attachment of the net to one remote end thereof results in an unbalanced load being placed on the trolley assembly by reason of which the trolley assembly pivots about one of the pulleys or trolley wheels meaning that the entire weight being moved by the trolley assembly is carried on only one rather than both of the pulleys. In other words, by failing to center the load, the trolley assembly does not operate in the intended fashion resulting in an improperly functioning device.

Because of the difficulties that have been mentioned, it has not been possible to engage in gill net fishing without the annoyance of trolley malfunctioning. It has, therefore, remained to provide a trolley assembly that is not only easy to place in an operating position on an anchored line but also is capable of smooth operation whereby the load is evenly balanced such that the gill net is equally supported by each of a pair of trolley wheels for rolling movement along the anchored line both during introduction of the gill net into the water and later retrieval of the gill net from the water after fish have been caught therein. Moreover, a trolley assembly having these attributes must be inexpensive to manufacture while at the same time being manufactured of materials that withstand repeated water exposure.

The present invention is directed to overcoming the above stated problems and establishing the stated objects by providing a unique trolley assembly.

SUMMARY OF THE INVENTION

Accordingly, the present invention is directed to a trolley assembly for use upon a line which is anchored in the water for retrieving a fishing net. The trolley assembly includes a weighted body member having a pair of trolley arms extending therefrom. The trolley arms are disposed at an angle to one another and are integrally associated with the body member to define a generally V-shaped assembly. The body member includes means disposed on a line bisecting the angle between the trolley arms for affixing a net securing line opposite the trolley arms. The trolley assembly also includes a pair of trolley wheels adapted to ride on the anchored line. One of the trolley wheels is mounted for wheel-rolling movement on each of the trolley arms. The trolley wheels are disposed in spaced relation to the body member. With this construction, one end of the fishing net can be secured to the trolley assembly with the net securing line and the other end of the fishing net can be controlled by a fishing line secured thereto.

In an exemplary embodiment, the body member is generally circular in a cross-section taken in a plane defined by the trolley arms. The body member is also preferably formed as a pair of frustoconical portions geometrically arranged in integral back-to-back relationship. In addition, the frustoconical portions of the body member are preferably formed of lead, the trolley arms are preferably formed of stainless steel, and the trolley wheels are preferably formed of aluminum.

Furthermore, the trolley arms each include a first arm portion extending from the body member, an upper return bend portion remote from the body member, and a second arm portion extending toward the body member in the preferred embodiment. The trolley arms each also include a lower return bend portion adjacent the body member with each of the lower return bend portions cooperating with the corresponding ones of the first and second arm portions to define a confined opening for receiving the anchored line. With this arrangement, the lower return bend portions each include a first extension which extend from the corresponding one of the second arm portions to the corresponding one of the first arm portions and a second extension which extends about the corresponding one of the first arm portions in a direction generally toward the other of the first arm portions.

In the first embodiment, the line affixing means includes a loop adapted to receive the net securing line. The loop is integrally associated with the body member at a point corresponding to the angle vertex of the trolley arms for substantially centering a load exerted by the fishing net between the trolley wheels. Moreover, the loop preferably projects from the body member in a direction generally opposite the trolley arms.

In addition, the trolley arms are each preferably formed of wire stock bent to have a pair of opposing loops spaced apart by a distance generally conforming to the width of the trolley wheels. The pairs of opposing loops are each then advantageously adapted to support one of the trolley wheels therebetween. For this purpose, the trolley wheels each include a pulley and an axle extending therethrough, and the axles each are adapted to mount one of the pulleys to the corresponding one of the trolley arms.

Other objects, advantages and features of the present invention will become apparent from the following specification taken in conjunction with the accompanying drawings.

BRIEF DESCRIPTION OF THE DRAWINGS

FIG. 1 is a front elevational view of a trolley assembly for a fishing net in accordance with the present invention;

FIG. 2 is an end elevational view of the trolley assembly of FIG. 1; and

FIG. 3 is a front elevational view of the trolley assembly of FIG. 1 being used upon a line which is anchored in the water for retrieving a fishing net.

DETAILED DESCRIPTION OF THE PREFERRED EMBODIMENT

An exemplary embodiment of a trolley assembly in accordance with the invention is illustrated in FIGS. 1 through 3. The trolley assembly 10 is adapted for use upon a line 12 which is anchored as at 14 for retrieving a fishing net 16. The trolley assembly 10 includes a weighted body member 18 having a pair of trolley arms 20 extending therefrom. The trolley arms 20 are disposed at an angle to one another and are integrally associated with the body member 18 to define a generally V-shaped assembly. The body member 18 includes means 22 disposed on a line 24 bisecting the angle between the trolley arms 20 for affixing a net securing line 26 opposite the trolley arms 20. The trolley assembly 10 also includes a pair of trolley wheels 28 adapted to ride on the anchored line 12. One of the trolley wheels 28 is mounted for wheel-rolling movement on each of the trolley arms 20. The trolley wheels 28 are disposed in spaced relation to the body member 18. The trolley assembly 10 is thus constructed such that one end 16a of the fishing net 16 can be secured to the trolley assembly 10 with the net securing line 26 and the other end 16b of the fishing net 16 can be controlled by a fishing line 30 secured thereto. Moreover, as will be apparent from the description that follows, the trolley assembly 10 not only can be easily and securely affixed to the anchored line 12 but will also operate in a highly effective manner due to load balancing.

Referring specifically to FIGS. 1 and 2, the body member 18 is generally circular in a cross-section taken in a plane defined by the trolley arms 20. It will also be seen that the body member 18 is formed as a pair of frustoconical portions 18a and 18b geometrically arranged in integral back-to-back relationship. Preferably, the frustoconical portions 18a and 18b of the body member 18 are formed of lead, the trolley arms 20 are formed of non-ferous metal coated spring steel wire or alternatively formed from flat stock of the same material, and the trolley wheels 28 are formed of aluminum.

As shown, the trolley arms 20 each include a first arm portion 20a extending from the body member 18, an upper return bend portion 20b remote from the body member 18, and a second arm portion 20c extending toward the body member 18. The trolley arms 20 each also include a lower return bend portion generally designated 20d adjacent the body member 18 with each of the lower return bend portions 20d cooperating with the corresponding one of the first and second arm portions 20a and 20c to define a confined opening 32 for receiving the anchored line 12. Additionally, the lower return bend portions 20d each preferably include a first extension 20d' which extends from the corresponding one of the second arm portions 20c to the corresponding one of the first arm portions 20a and a second extension 20d" which extends about the corresponding one of the first arm portions 20a in a direction generally toward the other of the first arm portions 20a.

As shown in FIG. 3, the line affixing means 22 preferably includes a loop adapted to receive the net securing line 26. The loop 22 is integrally associated with the body member 18 and projects from the body member 18 in a direction generally opposite the trolley arms 20. Moreover, as shown, the loop 22 is disposed at a point corresponding to the angle vertex of the trolley arms 20 for substantially centering a load exerted by the fishing net 16 between the trolley wheels 28.

While the choice of materials is not to be construed as limited, the trolley arms 20 are each preferably formed of wire stock bent to have a pair of opposing loops 20e with the innermost portions of the loops spaced apart by a distance closely conforming to the width of the trolley wheels 28. The pairs of opposing loops 20e each are adapted to support one of the trolley wheels 28 therebetween. Still further, the trolley wheels 28 each include a pulley 34 and an axle 36 extending therethrough, and the axles 36 each are adapted to mount one of the pulleys 34 to the corresponding pair of opposing loops 20e of the trolley arms 20.

As clearly shown in the drawings, the pair of trolley wheels 28 are adapted to ride on the anchored line 12. One of the trolley wheels 28 is mounted for wheel rolling movement on the first and second arm portions 20a and 20c inwardly of the return bend portion 20b of each of the trolley arms 20. Preferably, the trolley wheels 28 are disposed in spaced relation to the body member 18 near but slightly spaced from the upper return bend portion 20b.

With this construction, the trolley assembly 10 is placed on the anchor line 12 by wrapping the anchored line 12 about the first arm portions 20a adjacent the body member 18 on the sides opposite the second extensions 20d" of the lower return bend portions 20d. The anchored line 12 is then looped about the second extensions 20e" of the lower return bend portions 20d. When this has been done, the anchored line 12 is snapped between the first arm portions 20a and the second extensions 20d" of the lower return bend portions 20d to a point inwardly of the trolley arms 20 within the confined openings 32.

Once the anchored line 12 is disposed within the confined openings 32 defined by the trolley arms 20, the trolley wheels 28 can ride upon the anchored line 12 without the possibility of fouling. This is accomplished by reason of the fact that the first and second arm portions 20a and 20c are either in contacting or nearly contacting relation to the opposite sides of the trolley wheels 28 such that the anchored line 12 cannot become jammed between the outer side surfaces of the trolley wheels 28 and the corresponding arm portions 20a or 20c. Furthermore, since the anchored line 12 cannot exit the confined openings 32, the trolley wheels 28 will ride upon the anchored line 12 no matter what the orientation of the trolley assembly 10.

Referring specifically to FIG. 3, the unique balancing achieved by the present invention will be fully appreciated. It is there shown that the load exerted by the fishing net 16, which is initially provided by the weights 38 along the bottom edge thereof and which is later also provided by the fish caught within the net 16, will act precisely along the line 24 bisecting the angle between the trolley arms 20 (see FIG. 1) which will insure that both the trolley wheels 28 are maintained in contact with the anchored line 12 by means of an equal or nearly equal force applied to each of such trolley wheels 28. Since the anchored line 12 cannot inadvertently exit the confined openings 32 and will always be disposed such that the trolley wheels 28 will ride thereon, the balanced and centered loading on the trolley assembly 10 will ensure optimum operating performance.

While not to be construed as limiting, it will also be appreciated that the axles 36 can be formed of brass rivets. Thus, the loops 20e which are easily formed when the trolley arms 20 are constructed of wire stock, will be sized smaller than the heads of the rivets 36 so that the pulleys 34 will be safely disposed and retained between the first and second arm portions 20a and 20c for rolling movement therebetween. Furthermore, the wire stock easily accommodates the formation of all the various portions of the trolley arms 20 described hereinabove.

As shown in the drawings, the loop 22 is also formed of wire stock. It is acceptable, however, for not only the trolley arms 20, but also the loop 22, to be formed either integrally with the body member 18, or in any other manner conventional in the art. For instance, the loop 22 could be integrally formed as an opening through the outer edge of the body member 18.

While in the foregoing there has been set forth a preferred embodiment of the invention, it is to be understood that the invention is only to be limited by the spirit and scope of the appended claims.

I claim:

1. A trolley assembly for use upon a line which is anchored in the water for retrieving a fishing net, comprising:

a weighted body member having a pair of trolley arms extending therefrom, said trolley arms being disposed at an angle to one another and being integrally associated with said body member to define a generally V-shaped assembly, said body member including means for affixing a net securing line thereto opposite said trolley arms;

said trolley arms each including a first arm portion extending from said body member, an upper return bend portion remote from said body member, and a second arm portion extending toward said body member;

said trolley arms each also including a lower return bend portion adjacent said body member, said lower return bend portions each cooperating with the corresponding ones of said first and second arm portions to define confined openings for receiving said anchored line, said lower return bend portions each including a first extension which extends from the corresponding one of said second arm portions to the corresponding one of said first arm portions, said lower return bend portions each also including a second extension which extends about the corresponding one of said first arm portions in a direction generally toward the other of said first arm portions;

said line affixing means being disposed on a line bisecting said angle between said trolley arms; and a pair of trolley wheels adapted to ride on said anchored line, one of said trolley wheels being mounted for wheel-rolling movement on each of said trolley arms, said trolley wheels being disposed in spaced relation to said body member;

whereby one end of said fishing net can be secured to said trolley assembly with said net securing line and the other end of said fishing net can be controlled by a fishing line secured thereto.

2. The trolley assembly as defined in claim 1 wherein said body member is generally circular in a cross-section taken in a plane defined by said trolley arms.

3. The trolley assembly as defined by claim 2 wherein said body member is formed as a pair of frustoconical portions, said frustoconical portions of said body member being geometrically arranged in integral back-to-back relationship.

4. The trolley assembly as defined by claim 3 wherein said frustoconical portions of said body member are formed of lead, said trolley arms are formed of stainless steel, and said trolley wheels are formed of aluminum.

5. The trolley assembly as defined by claim 1 wherein said line affixing means includes a loop adapted to receive said net securing line, said loop being integrally associated with said body member, said loop projecting from said body member in a direction generally opposite said trolley arms.

6. The trolley assembly as defined by claim 5 wherein said loop is integrally associated with said body member at a point corresponding to the angle vertex of said trolley arms for substantially centering a load exerted by said fishing net between said trolley wheels.

7. The trolley assembly as defined by claim 1 wherein said trolley arms are each formed of wire stock, said wire stock for each of said trolley arms being bent to have a pair of opposing loops spaced apart by a distance closely conforming to the width of said trolley wheels, said pairs of opposing loops each being adapted to support one of said trolley wheels therebetween.

8. The trolley assembly as defined by claim 1 wherein said trolley wheels each include a pulley and an axle extending therethrough, said axles each being adapted to mount one of said pulleys to the corresponding one of said trolley arms.

9. A trolley assembly for use upon a line which is anchored in the water for retrieving a fishing net, comprising:

a weighted body member having a pair of trolley arms extending therefrom, each of said trolley arms including a first arm portion extending from said body member, an upper return bend portion remote from said body member, and a second arm portion extending toward said body member, said trolley arms each also including a lower return bend portion adjacent said body member;

said lower return bend portions each including a first extension which extends from the corresponding one of said second arm portions to the corresponding one of said first arm portions and each also including a second extension which extends about the corresponding one of said first arm portions in a direction generally toward the other of said first arm portions; and a pair of trolley wheels adapted to ride on said anchored line, one of said trolley wheels being mounted for wheel-rolling movement on said first and second arm portions inwardly of said return bend portion of each of said trolley wheels, said trolley wheels being disposed in spaced relation to said body member;

said trolley assembly being placed on said anchored line by wrapping said anchored line about said first arm portions on the sides opposite said second extensions of said lower return bend portions, looping said anchored line about said second extensions of said lower return bend portions, and snapping said anchored line between said first arm portions and said second extensions of said lower return bend portions to a point inwardly of said trolley arms where said trolley wheels can ride upon said anchored line;

whereby one end of said fishing net can be secured to said trolley assembly and the other end of said fishing net can be controlled by a fishing line secured thereto.

10. The trolley assembly as defined by claim 9 wherein said trolley arms are disposed at an angle to one another and are integrally associated with said body member to define a generally V-shaped assembly.

11. The trolley assembly as defined by claim 9 wherein said body member includes means for affixing a net securing line thereto opposite said trolley arms, said line affixing means being disposed on a line bisecting said angle between said trolley arms.

12. The trolley assembly as defined by claim 10 wherein said body member is generally circular in a cross-section taken in a plane defined by said trolley arms, said body member being formed as a pair of frustoconical portions geometrically arranged in integral back-to-back relationship.

13. The trolley assembly as defined by claim 11 wherein said line affixing means includes a loop adapted to receive said net securing line, said loop being integrally associated with said body member at a point corresponding to the angle vertex of said trolley arms for substantially centering a load exerted by said fishing net between said trolley wheels, said loop projecting from said body member in a direction generally opposite said trolley arms.

14. The trolley assembly as defined by claim 9 wherein said trolley arms are each formed of wire stock, said wire stock for each of said trolley arms being bent to have a pair of opposing loops spaced apart by a distance closely conforming to the width of said trolley wheels, said pairs of opposing loops each being adapted to support one of said trolley wheels therebetween.

15. The trolley assembly as defined by claim 9 wherein said trolley wheels each include a pulley and an axle extending therethrough, said axles each being adapted to mount one of said pulleys to the corresponding one of said trolley arms.

16. The trolley assembly as defined by claim 15 wherein said frustoconical portions of said body member are formed of lead, said trolley arms are formed of stainless steel, and said trolley wheels are formed of aluminum.

* * * * *